United States Patent
Miller et al.

(10) Patent No.: US 11,409,659 B2
(45) Date of Patent: Aug. 9, 2022

(54) TAGS AND DATA FOR CACHES

(71) Applicant: Rambus Inc., San Jose, CA (US)

(72) Inventors: Michael Raymond Miller, Raleigh, NC (US); Dennis Doidge, Apex, NC (US); Collins Williams, Raleigh, NC (US)

(73) Assignee: Rambus Inc., San Jose, CA (US)

( * ) Notice: Subject to any disclaimer, the term of this patent is extended or adjusted under 35 U.S.C. 154(b) by 0 days.

(21) Appl. No.: 17/221,639

(22) Filed: Apr. 2, 2021

(65) Prior Publication Data

US 2021/0326265 A1 Oct. 21, 2021

Related U.S. Application Data

(63) Continuation of application No. 16/450,782, filed on Jun. 24, 2019, now Pat. No. 10,970,220.

(60) Provisional application No. 62/690,246, filed on Jun. 26, 2018.

(51) Int. Cl.
*G06F 12/0868* (2016.01)
*G06F 3/06* (2006.01)

(52) U.S. Cl.
CPC ........ *G06F 12/0868* (2013.01); *G06F 3/0604* (2013.01); *G06F 3/0658* (2013.01); *G06F 3/0673* (2013.01)

(58) Field of Classification Search
CPC .... G06F 3/0673; G06F 3/0658; G06F 3/0604; G06F 12/0868
See application file for complete search history.

(56) References Cited

U.S. PATENT DOCUMENTS

| | | | |
|---|---|---|---|
| 2004/0030834 A1* | 2/2004 | Sharma | G06F 12/0897 711/3 |
| 2012/0290793 A1* | 11/2012 | Chung | G06F 12/0895 711/119 |
| 2013/0138892 A1 | 5/2013 | LOh et al. | |

OTHER PUBLICATIONS

Gabriel H. Loh and Mark D. Hill, "Efficiently Enabling Conventional Block Sizes for Very Large Die-stacked DRAM Caches", Department of Computer Sciences University of Wisconsin—Madison https://pdfs.semanticscholar.org/e032/19dd2b9d118ca71930da87c1a5ba712a1583.pdf http://research.cs.wisc.edu/multifacet/papers/micro11_missmap.pdf.

Zhe Wang et al. "Building a Low Latency, Highly Associative DRAM Cache with the Buffered Way predictor", semanticScholar.org https://pdfs.semanticscholar.org/e032/19dd2b9d118ca71930da87c1a5ba712a1583.pdf. 9 pages.

* cited by examiner

*Primary Examiner* — Edward J Dudek, Jr.
(74) *Attorney, Agent, or Firm* — Lowenstein Sandler LLP

(57) ABSTRACT

A device includes a memory controller and a cache memory coupled to the memory controller. The cache memory has a first set of cache lines associated with a first memory block and comprising a first plurality of cache storage locations, as well as a second set of cache lines associated with a second memory block and comprising a second plurality of cache storage locations. A first location of the second plurality of cache storage locations comprises cache tag data for both the first set of cache lines and the second set of cache lines.

20 Claims, 10 Drawing Sheets

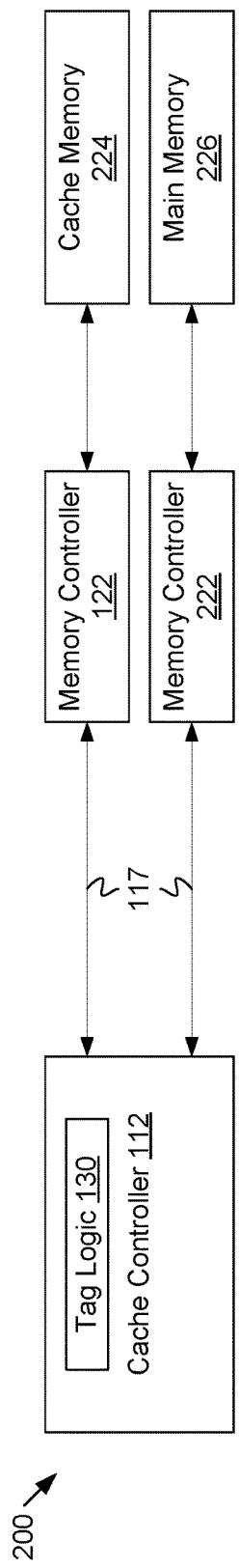
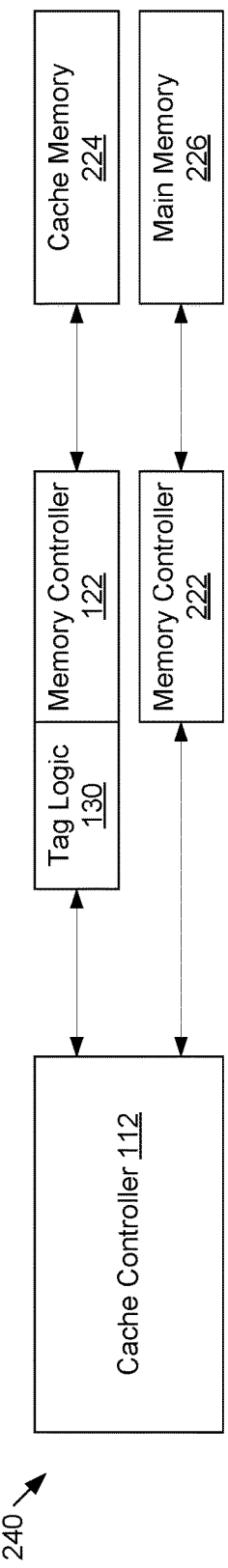
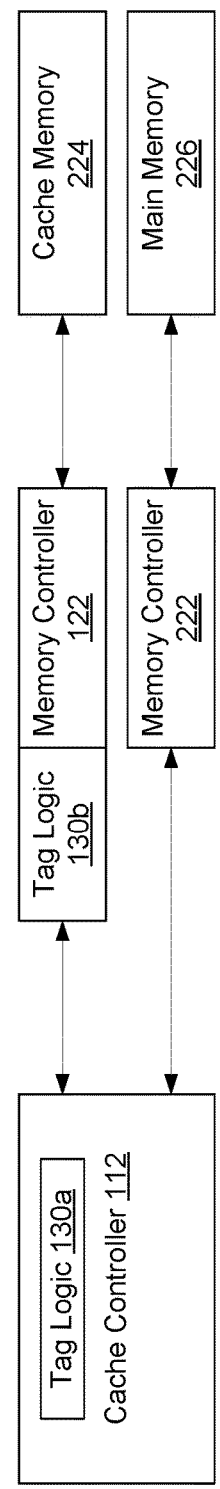
Fig. 2A
Fig. 2B
Fig. 2C

TAGS AND DATA FOR CACHES

RELATED APPLICATION

This application is a continuation application of U.S. patent application Ser. No. 16/450,782, filed Jun. 24, 2019, which claims the benefit of U.S. Provisional Application Ser. No. 62/690,246, filed Jun. 26, 2018, all contents of which are hereby incorporated by reference in its entirety.

TECHNICAL FIELD

This disclosure relates to the field of memory systems and, in particular, to storing tags and data for caches.

BACKGROUND

Modern computer systems generally include a data storage device, such as a memory component. The memory component may be, for example a random access memory (RAM) or a dynamic random access memory (DRAM). The memory component includes memory banks made up of storage cells which are accessed by a memory controller or memory client through a command interface and a data interface within the memory component.

BRIEF DESCRIPTION OF THE DRAWINGS

The present disclosure is illustrated by way of example, and not by way of limitation, in the figures of the accompanying drawings.

FIGS. 2A-2C are block diagrams illustrating environments for storing tags and data in a cache, according to embodiments.

DETAILED DESCRIPTION

Figure 1:
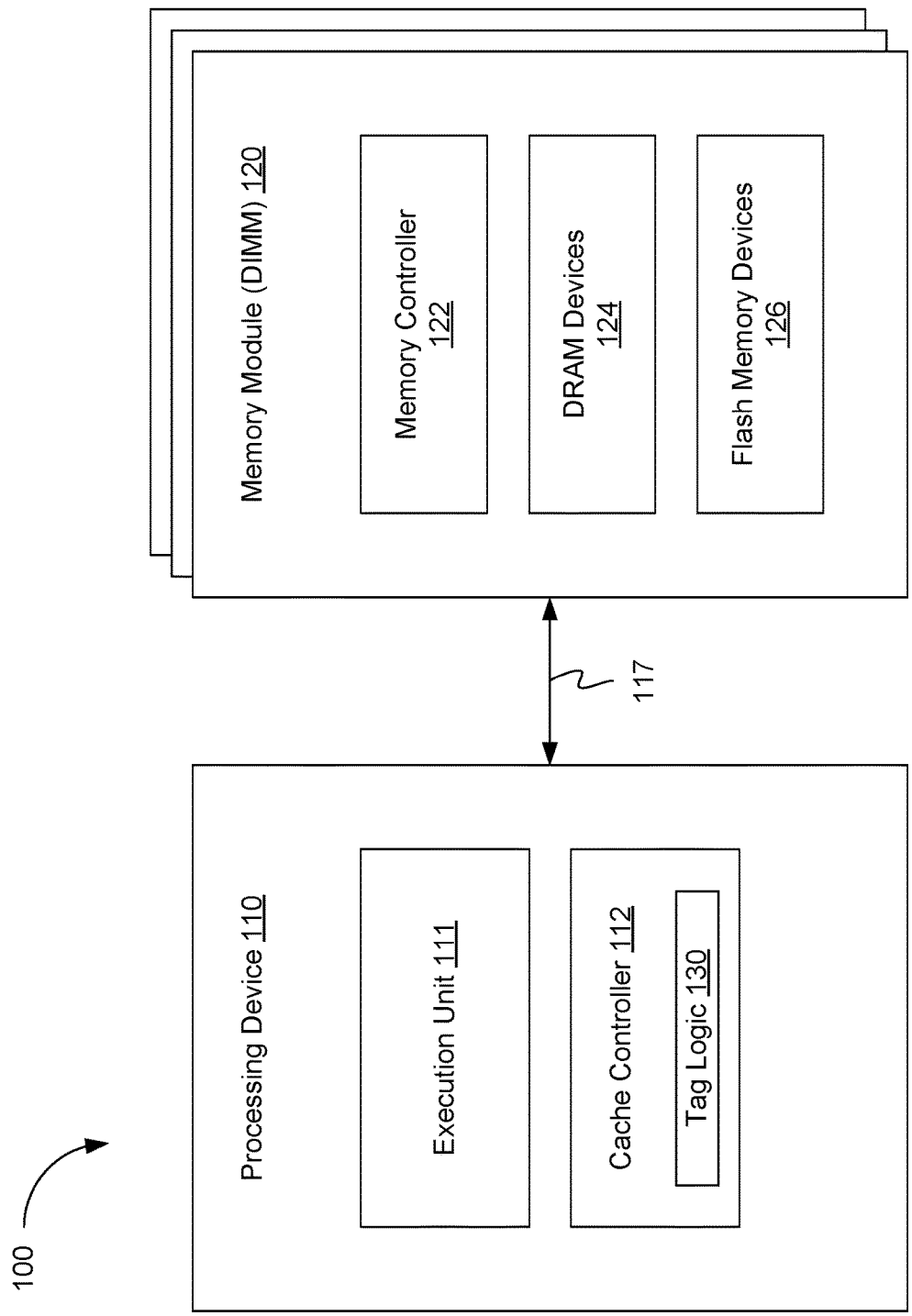
FIG. 1 is a block diagram illustrating a computing system with a cache, according to an embodiment.

The following description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Described herein is a system and method for storing tags and data in a cache. In one embodiment, the tags and data (i.e., cache lines) are co-located in the same cache memory in an efficient manner in terms of space and access. In one embodiment, where the cache memory is an N-way, set associative cache, the tags for each cache line stored in multiple sets across the cache, are stored together in the space that would normally be occupied by one of the ways of one of the sets.

When data from a main memory is stored in a cache memory, such as to enable faster access to frequently used data, a cache tag is often used to uniquely identify the corresponding piece of data. When the data is requested, a memory controller can compare the stored cache tag to a tag provided by the requestor to ensure that the proper piece of data is retrieved from the cache. In one embodiment, the cache tag comprises a portion of a memory address of the cache line from the main memory. For example, some designated number of the most significant bits of the memory address may be used as the cache tag.

Tag fields for caches use a relatively small amount of memory compared to the associated data stored in the cache. The difference in sizes can be an order or magnitude or more. In an application-specific integrated circuit (ASIC) or field-programmable gate array (FPGA), it can be relatively straightforward to design custom-sized memories for each of the tag and data fields. In this case, there can be a separate tag memory and data memory, which each have different sizes. However, in a system where the tags and data are stored in off-chip memories or within the processing device but across an internal bus, the large size difference between the tag and data fields make the organization complex and retrieval inefficient. System may attempt to solve the problem by combining the tag memory and data memory together, such that the tags for the cache lines in a given set are stored together with the cache lines themselves. When the cache memory is divided into usable sized blocks (i.e., where the size is some multiple of a power-of-two to enable efficient addressing), the size difference between the tags and the data can lead to either wasted memory space or complex addressing schemes. For example, if the tag data is stored in its own cache block, it may not use all of the available space. When this is repeated for each cache line, a significant amount of storage space goes unused. If that space is not wasted, and cache data is stored adjacent to the tags, then cache lines may not be stored on the power-of-2 block boundaries, increasing complexity for the controller in locating those cache lines.

In one embodiment, which may address potential problems in associative caches, the tags and data can be stored in the same cache memory by replacing one of the ways in one of the sets with tag information for some or all of the ways in some or all of the sets. Depending on the number of sets, the number of ways, and the size of the ways, more than one tag location can be used, such that for every X sets, one of the ways in one of the X sets can be replaced with the tag data for some or all of the ways in the X sets. If the number of ways is high enough, the resulting degradation in hit rate for the set that lost a way maybe negligible or acceptable.

This approach can allow some or all of the tag information to be located together for quick access and the tag locations for a requested set can be easily derived from a request address. In addition, the location of the data can be easily derived when there is a cache hit from the request address and the tag. In one embodiment, for systems with multiple read/write ports to memory, the tag fields and data fields can be located in different memories or different memory banks. For example, by storing the tags for even sets in a way of an odd set and vice versa, the controller could perform simultaneous reading and writing of tag and data, thereby improving performance. Additional details are provided below with respect to FIGS. 1-9.

FIG. 1 is a block diagram illustrating a computing system with a cache, according to an embodiment. In one embodiment, the computing system 100 includes processing device 110 and one or more memory modules 120. While only a single computing device is illustrated, the term "computing device" shall also be taken to include any collection of machines that individually or jointly execute a set (or multiple sets) of instructions to perform any one or more of the methodologies discussed herein.

Processing device 110 may be, for example, a multi-core processor including multiple cores. These cores may be physical processors, and may include various components such as front end units, execution units and back end units. Processing device 110 may represent one or more general-purpose processing devices such as a microprocessor, central processing unit, or the like. Processing device 110 may implement a complex instruction set computing (CISC) architecture, a reduced instruction set computer (RISC) architecture, a very long instruction word (VLIW) architecture, or other instruction sets, or a combination of instruction sets, through translation of binary codes in the above mentioned instruction sets by a compiler. Processing device 110 may also be one or more special-purpose processing devices such as an application specific integrated circuit (ASIC), a field programmable gate array (FPGA), a digital signal processor (DSP), network processor, or the like. Processing device 110 may be configured to execute processing logic for performing the operations discussed herein.

Processing device 110 may employ execution units including logic to perform algorithms for process data, such as in the embodiments described herein. In this illustrated embodiment, processing device 110 includes one or more execution units 111 to implement an algorithm that is to perform at least one instruction. One embodiment may be described in the context of a single processor system, but alternative embodiments may be included in a multiprocessor system. The processing device 110 may be coupled to a processor bus 117 that transmits data signals between the processing device 110 and other components in the computing system 100.

Execution unit 111, including logic to perform integer and floating point operations, also resides in the processing device 110. The processing device 110, in one embodiment, includes a microcode (μcode) ROM to store microcode, which when executed, is to perform algorithms for certain macroinstructions or handle complex scenarios. Here, microcode is potentially updateable to handle logic bugs/fixes for processing device 110. In one embodiment, processing device 110 further includes cache controller 112 and an optional processing device cache (not shown). The processing device cache, however, may be limited in size and/or capacity. Thus, cache controller 112 may further utilize a separate cache implemented in one of memory modules 120. Depending on the embodiment, memory modules 120 may be internal (e.g., on the same chip or package) or external to computing system 100. Each of memory modules 120 may include a memory controller 122, dynamic random access memory (DRAM) devices 124 and flash memory devices 126 and/or other non-volatile memory devices. In addition, or in the alternative, memory module 120 may include read-only memory (ROM), synchronous DRAM (SDRAM), Rambus DRAM (RDRAM), static random access memory (SRAM), etc. In other embodiments, memory module 120 may include some other type of storage device for storing information in a form (e.g., software, processing application) readable by a machine (e.g., a computer). In one embodiment, memory modules 120 may be dual in-line memory modules (DIMMs), which each comprise a series of DRAM integrated circuits mounted together on a printed circuit board. Each of memory modules 120 may be coupled to processing device 110 via an individual or shared processor bus 117 or other interconnect.

In one embodiment, the flash memory devices 126, or other non-volatile memory devices on memory module 120 may be used as a main memory for computing system 100. These flash memory devices 126, however may be slower, thus causing latencies in access times by processing device 110. Accordingly, the DRAM devices 124 or other volatile memory device on memory module 120 may be used as a cache memory to reduce the average memory access times. In one embodiment, the cache memory may be located on one of memory modules 120 while the corresponding main memory may be located on another one of memory modules 120. The cache memory may use smaller, faster DRAM devices 124 to store copies of data from the most frequently used locations in flash memory devices 126. Data may be transferred between flash memory devices 126 and DRAM device 124 in blocks of fixed size, called cache lines. When a cache line is copied from flash memory devices 126 into DRAM devices 124, a cache entry is created. The cache entry may include the copied data as well as an identifier formed from the requested memory location (i.e., the tag). In one embodiment, memory controller 122 may be designated to manage operations of either DRAM devices 124, flash memory device 126 or both. In one embodiment, memory controller 122 may have multiple channels by which it can individually control DRAM devices 124 and flash memory devices 126. For example, memory controller 122 may receive data access requests (e.g., either for tag data, cache lines, or main memory addresses) and read or write data from the corresponding location on one of DRAM devices 124 or flash memory devices 126.

In one embodiment, cache controller 112 includes tag logic 130 which coordinates the storage of tag data for multiple sets together in a single set of the cache memory. When cache controller 112 needs to read from or write to a location in memory, the cache controller 112 may instruct memory controller 122 to first check whether a copy of the relevant data is currently cached in DRAM devices 124. If the data is found in DRAM devices 124, cache controller 112 may read from or write to the cache. These cache accesses may typically be much faster than reading from or writing to flash memory devices 126. In one embodiment, as long as most memory accesses are cached memory locations on DRAM devices 124, the average latency of memory accesses will be closer to the cache latency than to the latency of main memory. Depending on the architecture, computing system 100 may include a single internal cache or multiple levels of internal caches. Other embodiments include a combination of both internal and external caches depending on the particular implementation and needs.

FIGS. 2A-2C are block diagrams illustrating various environments for storing tags and data in a cache, according to embodiments. In one embodiment, the environment 200 illustrated in FIG. 2A includes cache controller 112, cache memory 224, and main memory 226. As discussed above, cache memory 224 may be implemented on DRAM devices 124 and main memory 226 may be implemented on flash memory devices 126. Depending on the embodiment, cache memory 224 may have designated memory controller 122 and main memory 226 may have designated memory controller 222. In other embodiments, cache memory 224 and main memory 226 may share a common memory controller. In one embodiment, tag logic 130 may be implemented within cache controller 112. In other embodiments, for example as illustrated in environment 240 of FIG. 2B tag logic 130 may be standalone logic located between cache controller 112 and memory controller 122 (i.e., coupled to processor bus 117) or may be implemented within memory controller 122. In another embodiment, as illustrated in environment 250 of FIG. 2C, portions of tag logic 130a, 130b may be located both within cache controller 112 and within or near memory controller 122. Regardless of location, tag logic 130 may determine how much space is needed to store the tags for the data in cache memory 224. The amount of space that the tags will occupy may be impacted by the number of sets, the number of ways, the size of a way, and the number of memory blocks that are mapped to each set. Tag logic 130 can determine how many ways will be utilized in order to store all of the tags for the cache memory 224. Upon determining such, tag logic 130 can reserve the memory space in cache memory 224 that would normally have been used as one or more ways in a particular set for tag storage. To reserve the space, tag logic 130 may mark entries corresponding to the reserved space as unavailable for storing cache lines in a cache memory address mapping table or other data structure managed by memory controller 122. This will result in at least one set having at least one fewer way that the other sets, but the impact on performance may be negligible or acceptable if, for example, the number of ways is sufficiently large.

Upon reserving space for cache tag storage, tag logic 130 can add tag data for each cache line stored in cache memory 224 to the reserved tag space. As described further below with respect to FIG. 3B, tags for cache lines stored across multiple sets of cache memory 224 may all be stored together in the reserved tag space in a single set of the multiple sets. As a result, the tag data for each of the cache lines in each set can be stored in a contiguous memory space. As described further below with respect to FIG. 4 the cache tags may include a portion of a memory address of each of the cache lines (e.g., a set number of the most significant bits of the memory address) that uniquely identifies the corresponding cache line. Additional details regarding the operation of tag logic 130 are provided below.

Figure 3A:
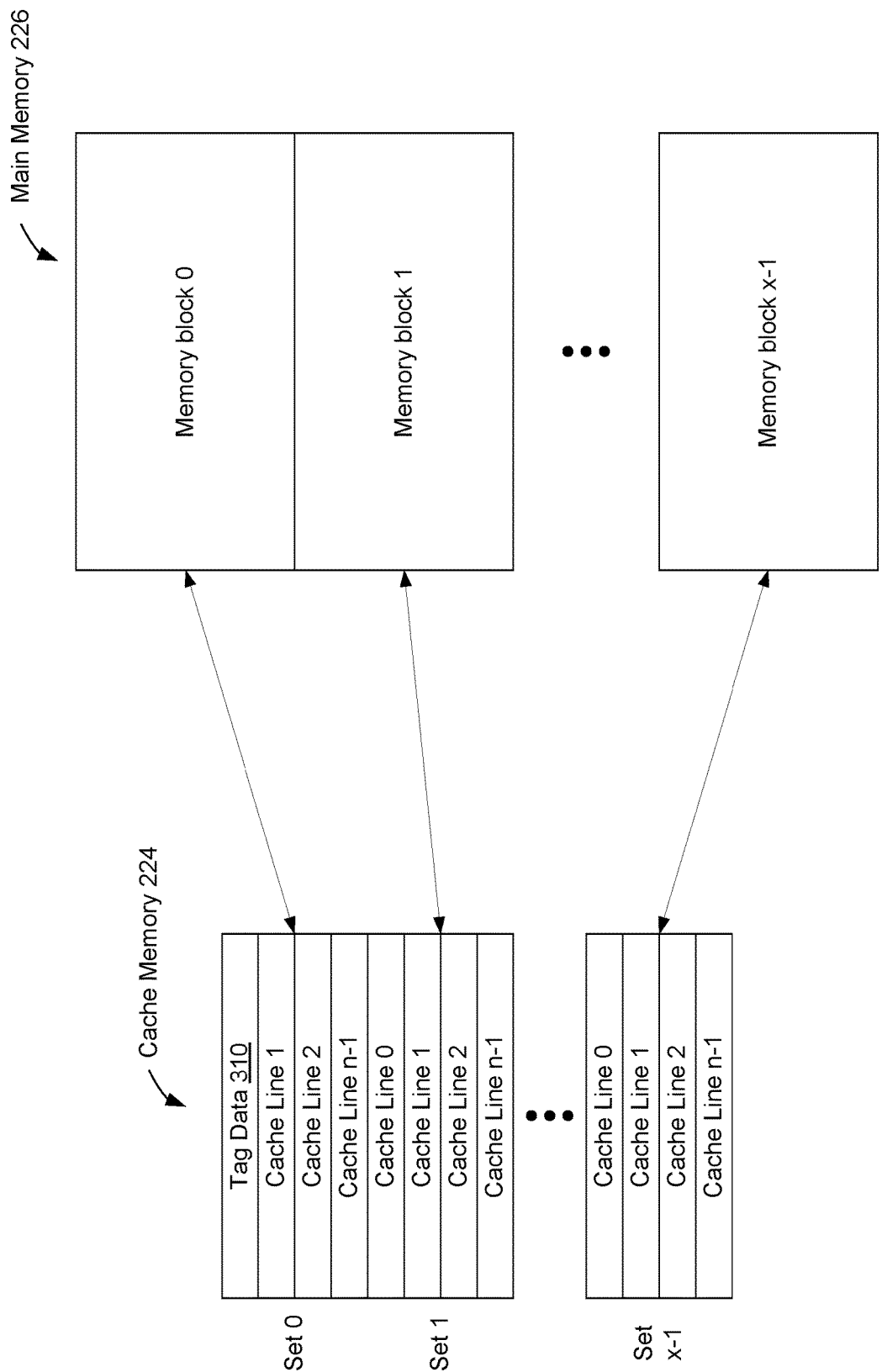
FIG. 3A is a block diagram illustrating the storage of tags and data in an associative cache, according to an embodiment.

FIG. 3A is a block diagram illustrating the storage of tags and data in an associative cache, according to an embodiment. In one embodiment, cache memory 224 is an N-way set associative cache used to temporarily store a portion of data from main memory 226 to improve average data access times. Associativity is a property of cache memory defining where any individual cache line can be stored. In a fully associative cache, a cache line being added to the cache can be stored at any location within the cache memory. In a direct mapped cache, each cache line has a designated location within the cache memory and that location is the only place that the cache line can be stored. An N-way set associative cache, such as cache memory 224, forms a compromise between these two extreme approaches. In one embodiment, main memory 226 includes x number of memory blocks. (i.e., memory block 0, memory block 1, . . . memory block x-1). Each of these memory blocks is associated with a particular set of N number of locations within cache memory 224. Each of the locations within a set where a cache line may be stored may be referred to as a "way." In this model, since a particular memory block in main memory 226 contains potentially many more lines of data than can fit in its corresponding memory set, the data from that particular memory block may be stored in any of the N-ways of the corresponding set. For example, if N=4, a cache line from memory block 1 of main memory 226 may be stored in any of 4 ways in set 1 of cache memory 224 (i.e., cache line 0, cache line 1, cache line 2, cache line n-1).

As illustrated in FIG. 3A, tag data 310 for the cache lines in cache memory 224 can be stored in the space that would normally be occupied by one of the ways. In this example, tag data 310 is stored in the location of what would have been way 0 of set 0. As a result, one fewer cache line may be stored in set 0 than in the other sets of cache memory 224. Tag data 310 may include tags for the cache lines stored, not just in set 0, but in all of the sets 0 through x-1 in cache memory 224, or at least a subset of those sets, space permitting. Depending on the embodiment, tag data 310 may be located at some other location, or at multiple locations, within cache memory 224. For example, tag data 310 need not necessarily reside in the location of what would have been the first way of the first set, and can instead be stored at the location of any of the ways in any of the sets. If all of the tags for cache memory 224 cannot fit in tag data 310 due to size constraints, additional tag data may be stored at another location, as described below with respect to FIGS. 7 and 8.

Figure 3B:
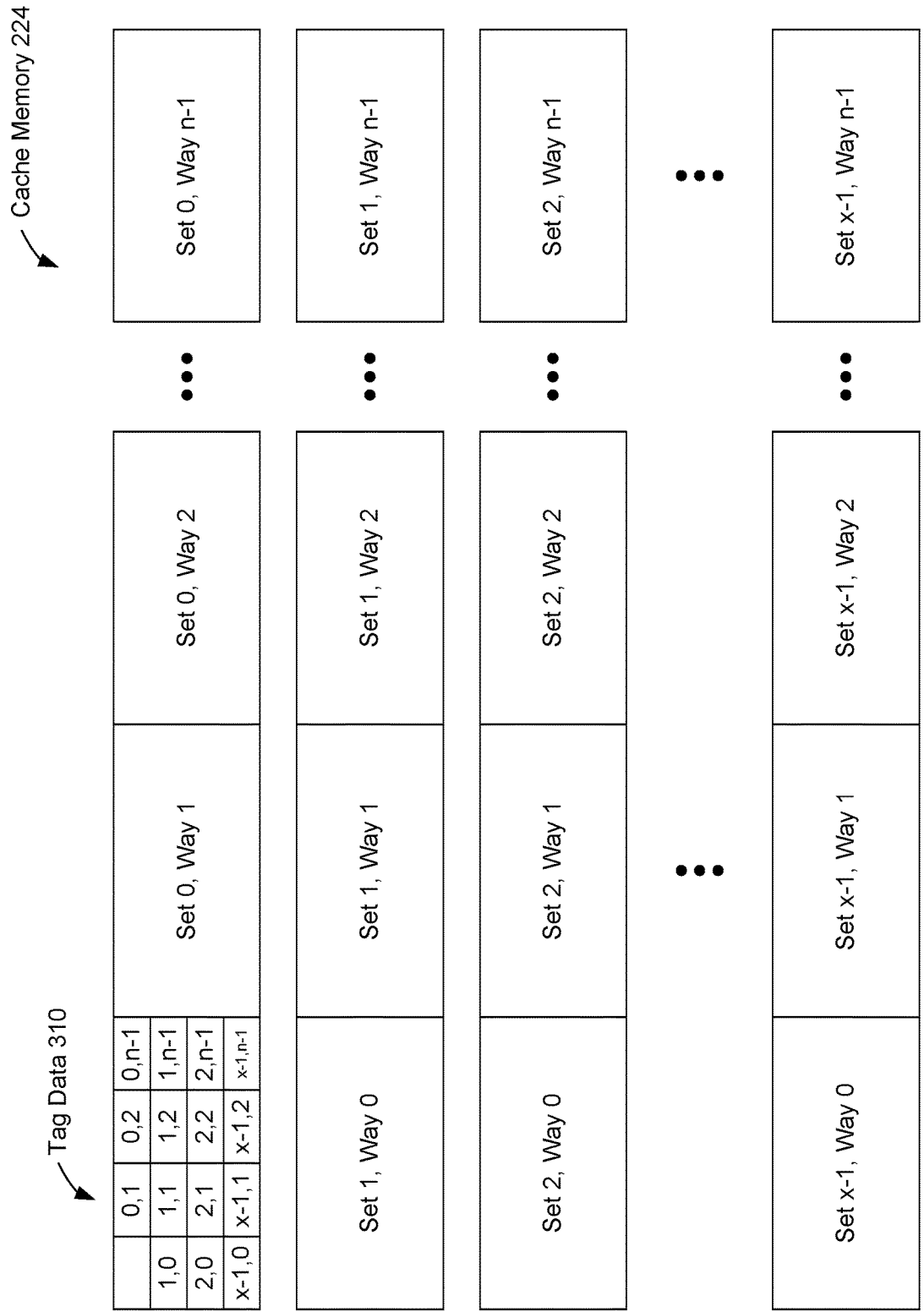
FIG. 3B is a block diagram illustrating the storage of tags and data in an associative cache, according to an embodiment.

FIG. 3B illustrates another view of the storage of tags and data in the N-way set associative cache, according to an embodiment. In this embodiment, the N-way set associative cache in cache memory 224 has X sets (i.e., set 0 through set x-1) where X is a power-of-2. Each of those X sets is divided into N ways of a fixed size (i.e., way 0 through way n-1). Since the size of tag for an individual cache line is so much smaller than the size of a way, storing a single tag in a way by itself adjacent to a way where the corresponding cache line is stored would result in large holes of unused storage in cache memory 224 and/or create inefficient addressing problems. Instead, in one embodiment, one way (e.g., set 0, way 0) is replaced and used to store all of the tags for the X sets in cache memory 224. Set 0 is penalized with one less way, meaning one less cache line from memory block 0 of main memory 226 can be cached at a particular point in time, but the remaining x-1 sets are not impacted. Since all of the tags reside in a contiguous memory space (i.e., tag data 310), fewer memory accesses are needed to read all of the tags for any given set.

With a typical size of memories being some multiple of a power-of-2, storing the tags together in tag data 310 can allow caches to reduce wasted space at a small performance penalty cost while maintaining an ease of addressability. Since the tags for each set are located in close proximity to each other in memory (e.g., in a contiguous memory space), and the arrangement of tags and data is uniform and repetitive, this method can allow for a minimum number of accesses to read all tags and quickly determine hit status and location of the corresponding cache lines. Furthermore, address translation between tag and data can be done quickly and efficiently.

Figure 4:
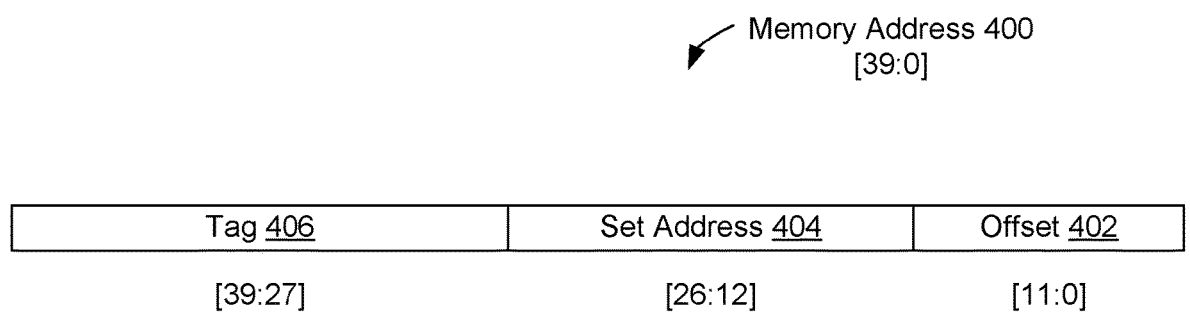
FIG. 4 illustrates a memory address, according to an embodiment.

FIG. 4 illustrates a memory address, according to an embodiment. In one embodiment, memory address 400 is a reference to a specific location in main memory 226. The memory address 400 can also be used to reference cache lines when stored in cache memory 224. Consider the following example. If main memory 226 has a capacity of one terabyte (TB), 40 address bits can be used to reference memory locations. Thus, memory address 400 can include 40 bits [39:0]. In one embodiment, a portion of the data from main memory 226, identified by memory address 400, can be stored in cache memory 224. In one embodiment, cache memory 224 is a 32-way, set associative cache with 4 kilobyte (KB) cache blocks. If cache memory 224 has a capacity of 4 gigabytes (GB) this results in $2^{15}$ sets. In one embodiment, the least significant 12 bits [11:0] of memory address 400 can be used as an offset 402. The offset 402 is used to identify a particular location within the cache line stored in cache memory 224. For example, once the cache line is identified by finding the right set and way, the particular byte or bytes within the cache line can be identified using the offset 402. The next 15 bits [26:12] are referred to as the set address 404 and are used to identify the particular set in cache memory 224 that contains the requested data. The remaining most significant 13 bits [39:27] are used as tag 406. The tag 406 is used to distinguish different memory addresses that can be placed in the set identified by set address 404. When a particular piece of data is requested from the cache memory 224, cache controller 112 may compare the tag of the requested data to the tag of each stored cache line to identify the correct data. In one embodiment, as described above, the tags for each cache line from multiple sets are stored together in a designated area in a single set as tag data 310.

Figure 5:
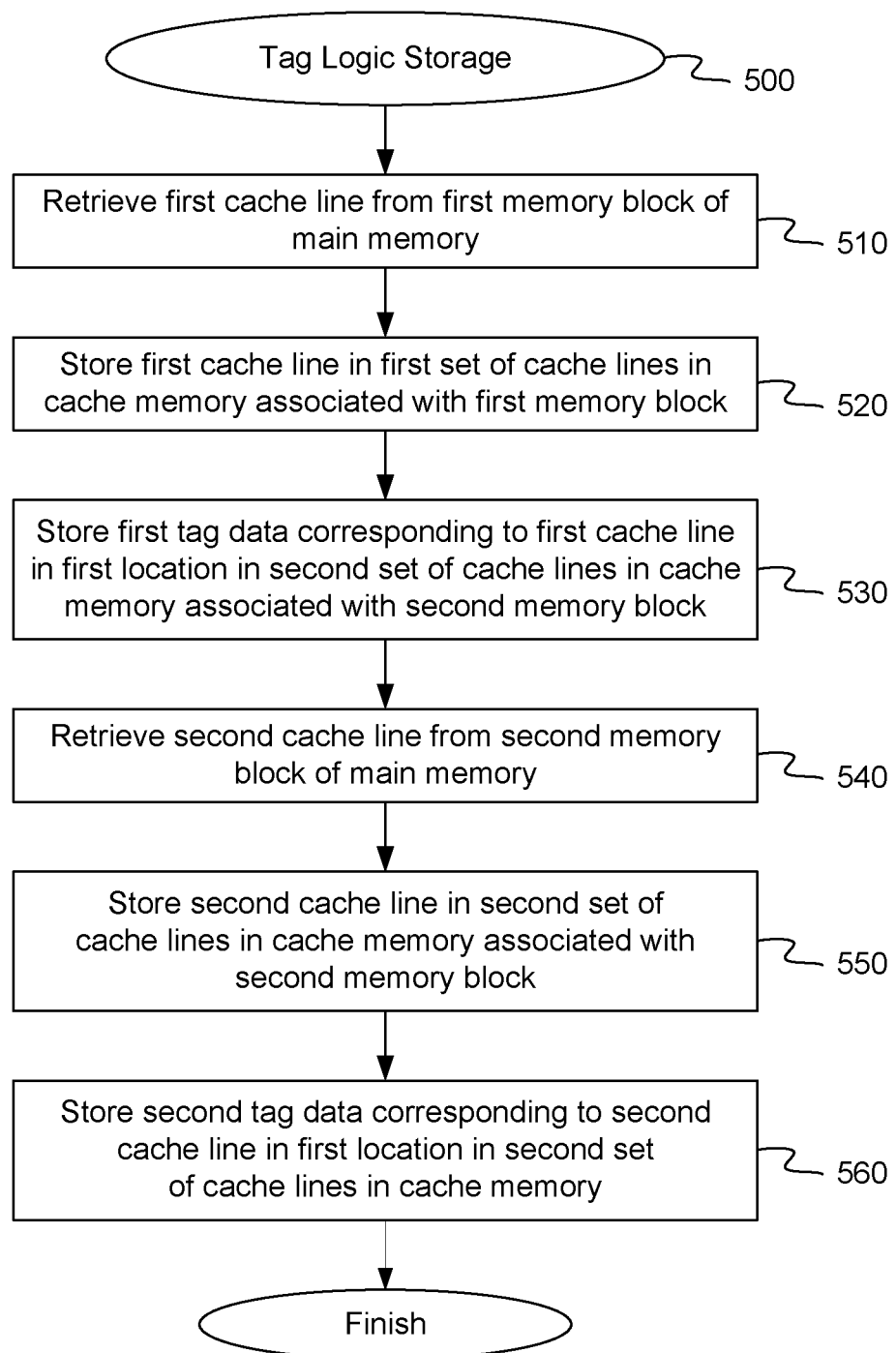
FIG. 5 is a flow diagram illustrating a method for storing tags and data in a cache, according to an embodiment.

FIG. 5 is a flow diagram illustrating a method for storing tags and data in a cache, according to an embodiment. The method 500 may be performed by processing logic that may comprise hardware (e.g., circuitry, dedicated logic, programmable logic, microcode, etc.), software (e.g., instructions run on a processing device to perform hardware simulation), or a combination thereof. The processing logic may receive and store tag data for corresponding cache lines across multiple sets of an n-way, set associative cache together in a single reserved tag location. In one embodiment, the method 500 is performed by tag logic 130, as shown in FIGS. 1 and 2.

Referring to FIG. 5, at block 510, method 500 retrieves a first cache line from a first memory block of the main memory. In one embodiment, cache controller 112 receives a request to access a particular cache line from memory module 120. The request may be received from execution unit 111 or from some other processing device in computing system 100. Cache controller 112 determines whether the requested cache line is present in cache memory 224 implemented on DRAM devices 124 via a process described below with respect to FIG. 6. If the cache line is not found in cache memory 224, cache controller 112 identifies the cache line in main memory 226 implemented on flash memory device 126 using the memory address 400, as shown in FIG. 4. In one embodiment, cache controller 112 provides memory address 400 to memory controller 222, and memory controller 222 determines that the memory address 400 points to data stored in memory block 1 of main memory 226.

At block 520, method 500 stores the first cache line in a first set of cache lines in the cache memory associated with the first memory block and comprising a first plurality of cache storage locations. In one embodiment, cache controller 112 instructs memory controller 122 to write a copy of the data to an available location (i.e., way) within set 1 of cache memory 224, since set 1 corresponds to memory block 1 of main memory 226. For example, memory controller 122 may store the data in way 0 of set 1. If there are no available locations within set 1, cache controller 112 may first evict data from set 1 according to a cache eviction policy such as first in first out, last in first out, least recently used, most recently used, random, pseudo-random, etc.

At block 530, method 500 stores first tag data corresponding to the first cache line in a first location of a second plurality of cache storage locations in a second set of cache lines in the cache memory associated with a second memory block. In one embodiment, tag logic 130 stores the tag 406 associated with the data in tag data 310, which may be located for example in the location that would normally be occupied by set 0, way 0. Even though the cache line is stored in set 1 of cache memory 224, the corresponding tag 406 may be stored in another set, along with all of the tags for all of the sets in cache memory 224.

At block 540, method 500 retrieves a second cache line from the second memory block of the main memory. In one embodiment, cache controller 112 receives a request to access a particular cache line from memory module 120. The request may be received from execution unit 111 or from some other processing device in computing system 100. Cache controller 112 determines whether the requested cache line is present in cache memory 224 implemented on DRAM devices 124. If the cache line is not found in cache memory 224, cache controller 112 identifies the cache line in main memory 226 implemented on flash memory device 126 using the memory address 400. In one embodiment, cache controller 112 provides memory address 400 to memory controller 222, and memory controller 222 determines that the memory address 400 points to data stored in memory block 0 of main memory 226.

At block 550, method 500 stores the second cache line in the second set of cache lines in the cache memory. In one embodiment, cache controller 112 instructs memory controller 122 to write a copy of the data to an available location (i.e., way) within set 0 of cache memory 224, since set 0 corresponds to memory block 0 of main memory 226. For example, memory controller 122 may store the data in way 1 of set 0. If there are no available locations within set 0, cache controller 112 may first evict data from set 0 according to a cache eviction policy.

At block 560, method 500 stores second tag data corresponding to the second cache line in the first location of the second plurality of cache storage locations. In one embodiment, tag logic 130 stores the tag 406 associated with the data in tag data 310, which may be located for example in the location that would normally be occupied by set 0, way 0. In this embodiment, the cache line is stored in set 0 of cache memory 224, along with the corresponding tag 406 in tag data 310 as well as all of the tags for all of the sets in cache memory 224.

Figure 6:
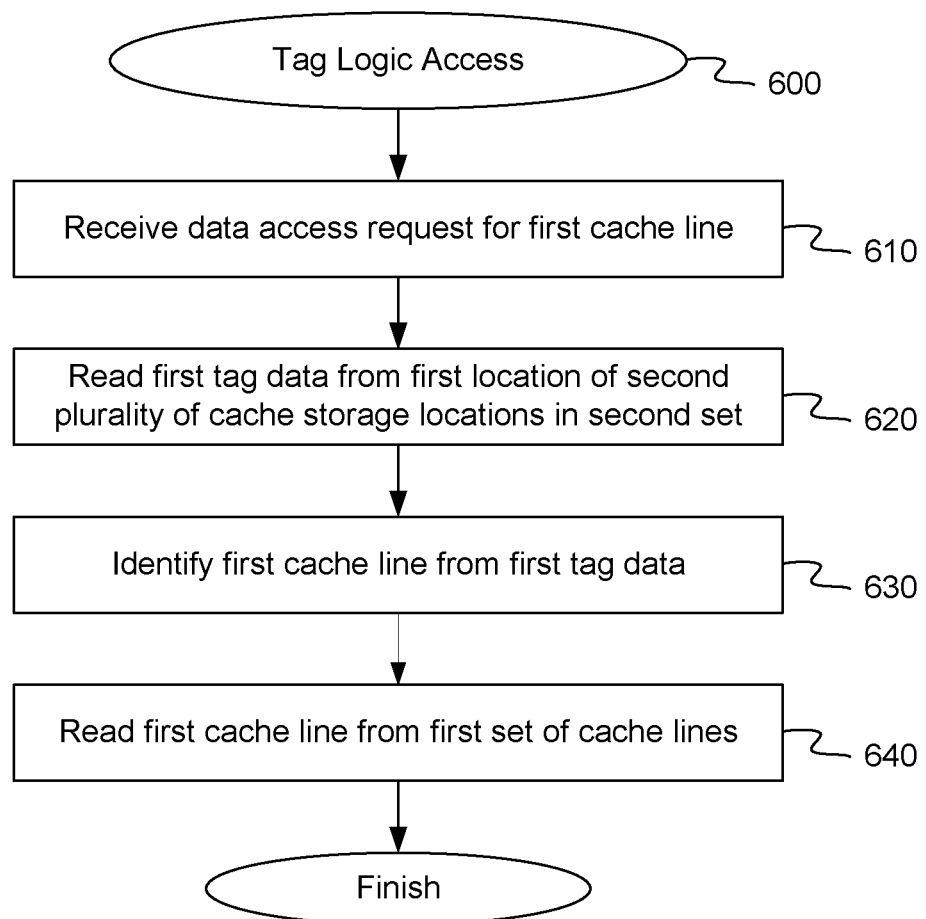
FIG. 6 is a flow diagram illustrating a method for accessing tags and data in a cache, according to an embodiment.

FIG. 6 is a flow diagram illustrating a method for accessing tags and data in an associative cache, according to an embodiment. The method 600 may be performed by processing logic that may comprise hardware (e.g., circuitry, dedicated logic, programmable logic, microcode, etc.), software (e.g., instructions run on a processing device to perform hardware simulation), or a combination thereof. The processing logic may access tag data for corresponding cache lines across multiple sets of an n-way, set associative cache, stored together in a single reserved tag location, to identify a requested cache line. In one embodiment, the method 600 is performed by tag logic 130, as shown in FIGS. 1 and 2.

Referring to FIG. 6, at block 610, method 600 receives a data access request for a first cache line. In one embodiment, cache controller 112 receives a request to access a particular cache line from memory module 120. The request may be received from execution unit 111 or from some other processing device in computing system 100. Cache controller 112 determines whether the requested cache line is present in cache memory 224 implemented on DRAM devices 124.

At block 620, method 600 reads the first tag data from the first location of the second plurality of cache storage locations. In one embodiment, the location of tag data 310 is known by tag logic 130 and when a request is received from cache controller 112, tag logic instructs memory controller 122 read tag data 310 from the known location (i.e., the location that would normally be occupied by set 0, way 0 in cache memory 224). The request from cache controller 112 may include the tag 406, set address 404, and offset 402 of the requested cache line.

At block 630, method 600 identifies the first cache line from the first tag data, the first cache line corresponding to a data access request. In one embodiment, tag logic 130 locates the tags in tag data 310 for a particular set identified by set address 404 where the requested cache line is stored. Tag logic 130 can compare the tag 406 of the requested cache line to each of the tags stored in tag data 310 for that particular set. Tag logic 130 can identify the requested cache line as having a stored in tag data 310 that matches the tag 406 from the request. The location of the matching stored tag within tag data 310 identifies the set and way in cache memory 224 where the corresponding cache line is located.

At block 640, method 600 reads the first cache line from the first set of cache lines. In one embodiment, tag logic 130 instructs memory controller 122 to retrieve the cache line from the identified set and way in cache memory 224 and returns the requested cache line to cache controller 112.

Figure 7:
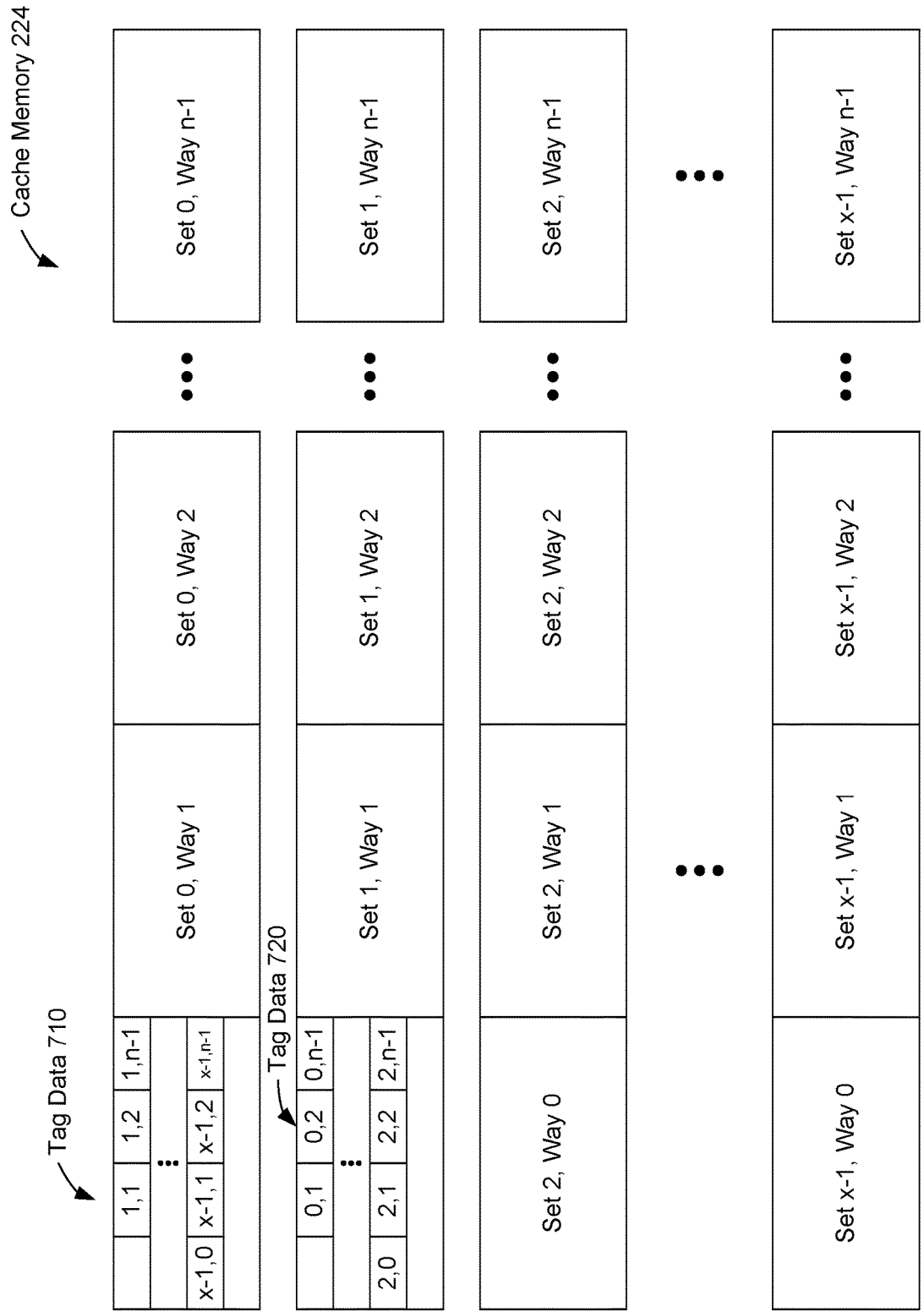
FIG. 7 is a block diagram illustrating the storage of tags and data in an associative cache, according to an embodiment.

FIG. 7 is a block diagram illustrating the storage of tags and data in an associative cache, according to an embodiment. In certain circumstances it may be beneficial to store tag data in multiple different locations in cache memory 224. In the embodiment illustrated in FIG. 7, tag data 710 is stored in the location that would normally be occupied by set 0, way 0 in cache memory 224, and tag data 720 is stored in the location that would normally be occupied by set 1, way 0 in cache memory 224. In one embodiment, tag data 710, stored in set 0, includes tags for all of the odd numbered sets in cache memory 224 (i.e., set 1, set x−1). Conversely, tag data 720, stored in set 1, includes tags for all of the even numbered sets in cache memory 224 (i.e., set 0, set 2). Storing tag data 710 and 720 in this matter ensures that tag data is never stored in the same set of cache memory 224 as the corresponding cache line or lines with which the tag data is associated. Since there may be certain overhead associated with accessing data in a given set (e.g., precharging or activating a row or column of the underlying DRAM devices 124) there may be latencies associated with making multiple successive reads within the same set. By separating the tag data and cache lines into different sets, as shown in FIG. 7, a first read operation to tag data 710 or 720 is then followed by a second read operation to the corresponding cache line in a different set. This sequence can be performed faster than successive reads to the same set.

Figure 8:
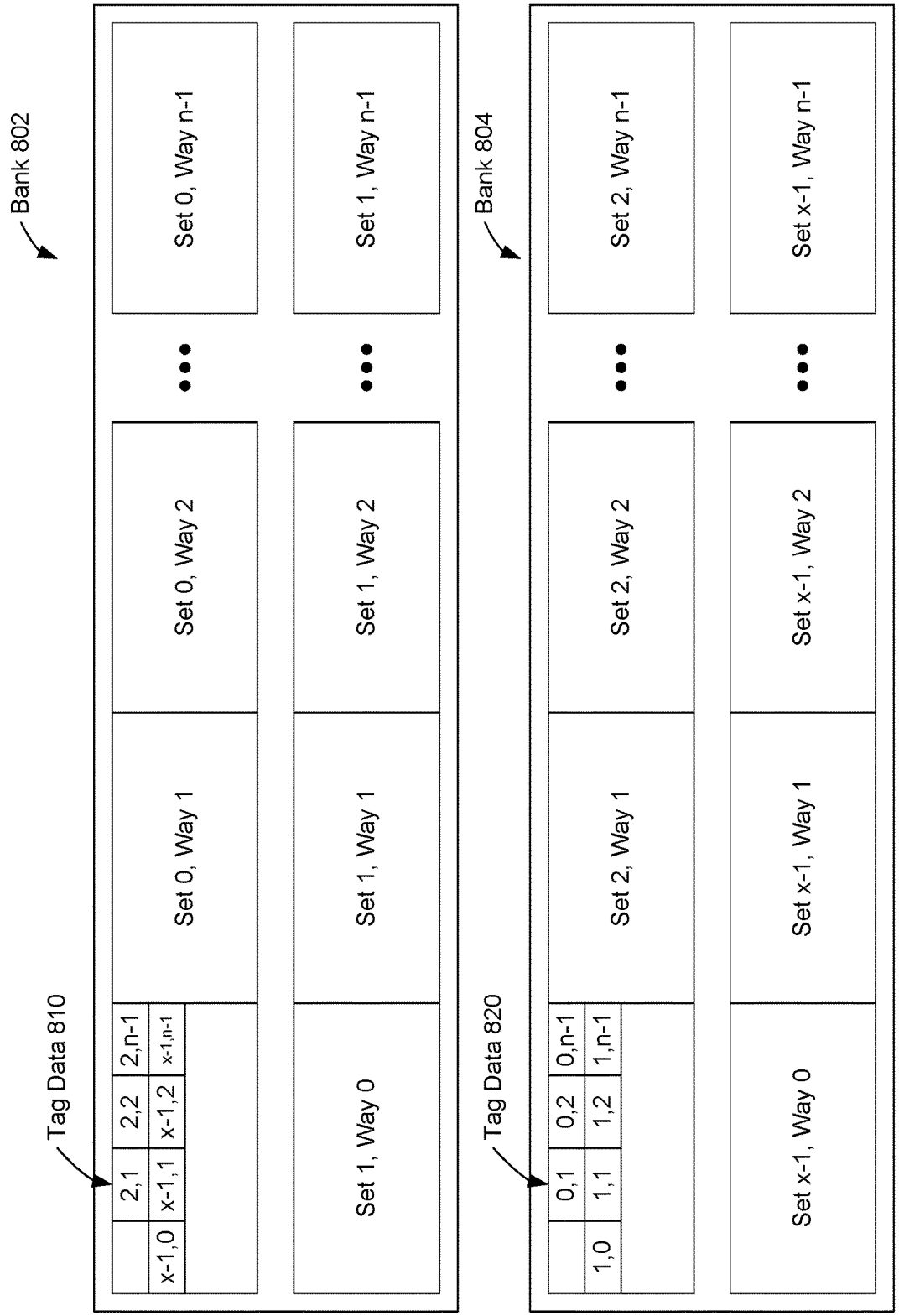
FIG. 8 is a block diagram illustrating the storage of tags and data in an associative cache, according to an embodiment.
Figure 9:
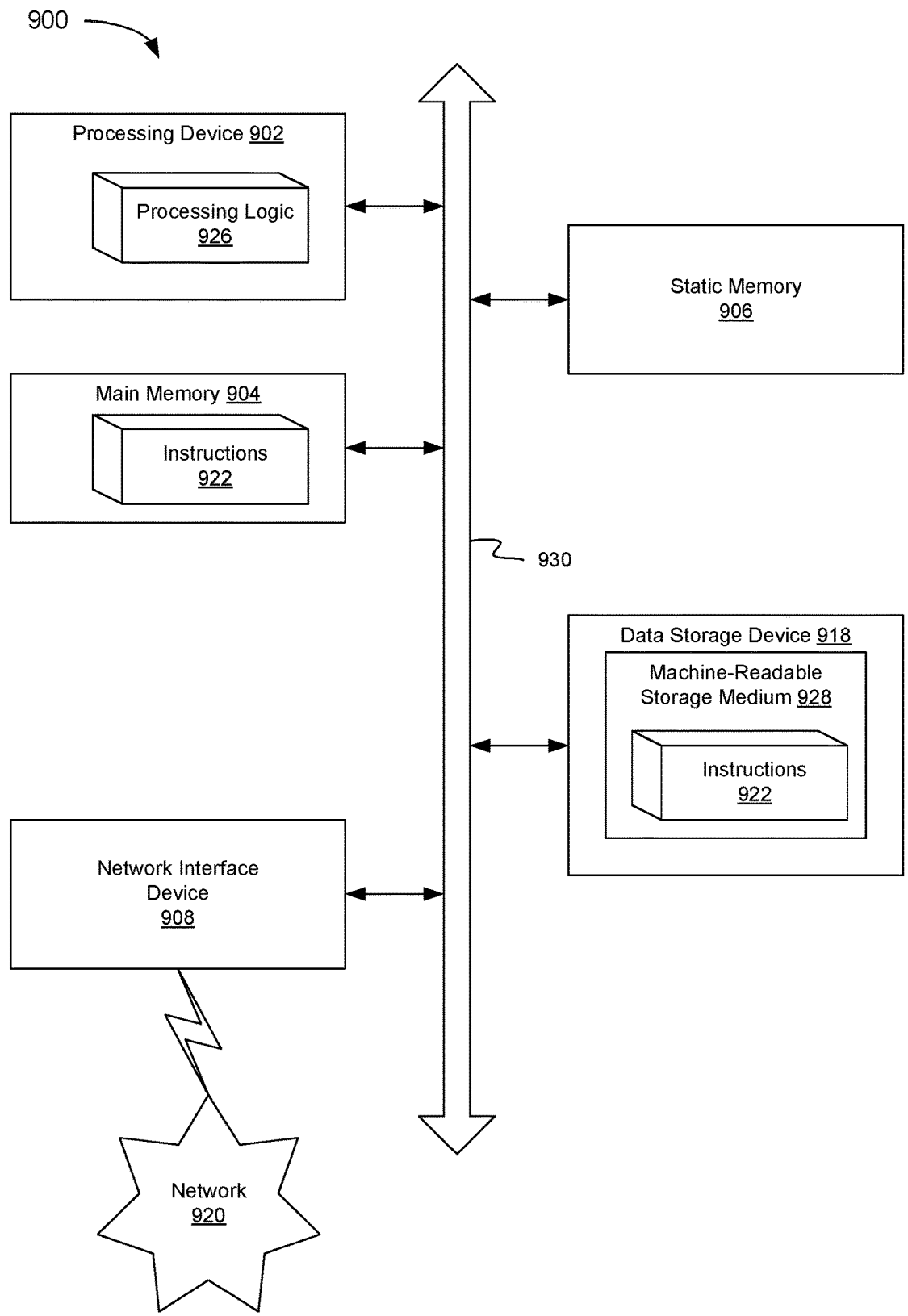
FIG. 9 depicts an example computer system which can perform any one or more of the operations described herein, in accordance with one or more aspects of the present disclosure.

FIG. 8 is a block diagram illustrating the storage of tags and data in an associative cache, according to an embodiment. In certain circumstances it may be beneficial to store tag data in multiple different locations in cache memory 224. In the embodiment illustrated in FIG. 8, tag data 810 is stored in the location that would normally be occupied by set 0, way 0 in cache memory 224, and tag data 820 is stored in the location that would normally be occupied by set 1, way 0 in cache memory 224. In this embodiment, these locations are located on different memory banks. Sets 0 and 1 are located on memory bank 802 and sets 2 and x−1 are located on bank 804. In one embodiment, tag data 810, stored in set 0 on bank 802, includes tags for all of sets on bank 804 (i.e., set 2, set x−1). Conversely, tag data 820, stored in set 2 on bank 804, includes tags for all of the sets on bank 802 (i.e., set 0, set 1). Storing tag data 810 and 820 in this matter ensures that tag data is never stored in the same memory bank as the corresponding cache line or lines with which the tag data is associated. Since there may be certain overhead associated with accessing data in a given memory bank (e.g., precharging or activating a row or column of the underlying DRAM devices 124) there may be latencies associated with making multiple successive reads within the same bank. By separating the tag data and cache lines into different banks, as shown in FIG. 8, a first read operation to tag data 810 or 820 is then followed by a second read operation to the corresponding cache line in a different memory bank. This sequence can be performed faster than successive reads to the same bank. In other embodiments, rather than being located on different memory banks, tag data 810 and 820 may be located on different memory channels or different memory chips FIG. 9 depicts an example computer system 900 which can perform any one or more of the methods described herein, in accordance with one or more aspects of the present disclosure. In one example, computer system 900 may correspond to a computing device capable of executing one or more the components described herein. The computer system 900 may be connected (e.g., networked) to other computer systems in a local area network (LAN), an intranet, an extranet, or the Internet. The computer system 900 may operate in the capacity of a server in a client-server network environment. The computer system 900 may be a personal computer (PC), a tablet computer, a set-top box (STB), a personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 900 includes a processing device 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)), and a data storage device 918, which communicate with each other via a bus 930.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to execute instructions for performing the operations and steps discussed herein. The computer system 900 may further include a network interface device 908 to couple computer system 900 to network 920.

The data storage device 918 may include a computer-readable medium 928 on which the instructions 922 (e.g., implementing tag logic 130) embodying any one or more of the methodologies or functions described herein is stored. The instructions 922 may also reside, completely or at least partially, within the main memory 904 and/or within the processing device 902 (where they may be referred to as processing logic 926) during execution thereof by the computer system 900, the main memory 904 and the processing device 902 also constituting computer-readable media. The instructions 922 may further be transmitted or received over a network via the network interface device 908.

While the computer-readable storage medium 928 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

What is claimed is:

1. A device comprising:
    a memory controller; and
    a cache memory coupled to the memory controller, the cache memory comprising:
        a first set of cache lines associated with a first memory block and comprising a first plurality of ways, wherein a first way of the first plurality of ways comprises cache tag data for both a second set of cache lines and a fourth set of cache lines; and a second set of cache lines associated with a second memory block and comprising a second plurality of ways, wherein a first way of the second plurality of ways comprises cache tag data for both the first set of cache lines and a third set of cache lines.

2. The device of claim 1, wherein the cache tag data for the second set of cache lines is adjacent to the cache tag data for the fourth set of cache lines in the first way of the first plurality of ways, and wherein the cache tag data for the first set of cache lines is adjacent to the cache tag data for the third set of cache lines in the first way of the second plurality of ways.

3. The device of claim 1, wherein the cache tag data in the first way of the first plurality of ways is for even numbered sets of cache lines in the cache memory, and wherein the cache tag data in the first way of the second plurality of ways is for even numbered sets of cache lines in the cache memory.

4. The device of claim 1, wherein the cache memory further comprises:
the fourth set of cache lines associated with a fourth memory block;
the third set of cache lines associated with a third memory block; and
a fifth set of cache lines associated with a fifth memory block, wherein the cache tag data for the fifth set of cache lines is stored in the first way of the second plurality of ways comprises.

5. The device of claim 1, wherein the cache memory comprises a set associative cache implemented on a dynamic random access memory (DRAM) device.

6. The device of claim 1, wherein the cache tag data comprises a portion of a memory address of each of the cache lines, wherein the portion uniquely identifies a corresponding cache line.

7. The device of claim 1, wherein the cache tag data for each of the cache lines in the first set of cache lines and the third set of cache lines is stored in a contiguous memory space in the first way of the second plurality of ways.

8. The device of claim 1, wherein the first set of cache lines and the second set of cache lines are in at least one of different memory banks, different memory channels, or different memory chips.

9. The device of claim 1, wherein the memory controller is configured to:
read the cache tag data from the first way of the first plurality of ways;
identify a cache line from the cache tag data, the cache line corresponding to a data access request; and
read the cache line from the third set of cache lines.

10. A device comprising:
a main memory;
a cache memory coupled to the main memory; and
a memory controller coupled to the cache memory, wherein the memory controller is configured to:
retrieve a first cache line from a first memory block of the main memory;
retrieve a second cache line from a second memory block of the main memory;
store the first cache line in a first set of cache lines in the cache memory associated with the first memory block and comprising a first plurality of ways;
store the second cache line in a second set of cache lines in the cache memory associated with the second memory block and comprising a second plurality of ways;
store cache tag data corresponding to the first cache line in a first way of the second plurality of ways in the second set of cache lines; and
store cache tag data corresponding to the second cache line in a first way of the first plurality of ways in the first set of cache lines.

11. The device of claim 10, wherein the memory controller is further configured to:
retrieve a fifth cache line from a fifth memory block of the main memory;
store the fifth cache line in a fifth set of cache lines in the cache memory; and
store cache tag data corresponding to the fifth cache line in the first way of the second plurality of ways.

12. The device of claim 10, wherein the cache memory comprises a set associative cache implemented on a dynamic random access memory (DRAM) device.

13. The device of claim 10, wherein the cache tag data comprises a portion of a memory address of each of the cache lines, wherein the portion uniquely identifies a corresponding cache line.

14. The device of claim 10, wherein the cache tag data for each of the cache lines in the first set of cache lines and a third set of cache lines is stored in a contiguous memory space in the first way of the second plurality of ways.

15. The device of claim 10, wherein the first set of cache lines and the second set of cache lines are in at least one of different memory banks, different memory channels, or different memory chips.

16. The device of claim 10, wherein the memory controller is first configured to:
read the cache tag data from the first way of the first plurality of ways;
identify a cache line from the cache tag data, the cache line corresponding to a data access request; and
read the cache line from a third set of cache lines.

17. A cache memory device comprising:
a first set of cache lines associated with a first memory block and comprising a first plurality of ways; and
a second set of cache lines associated with a second memory block and comprising a second plurality of ways, wherein a first way of the second plurality of ways comprises cache tag data for both the first set of cache lines and a third set of cache lines, wherein a first way of the first plurality of ways comprises cache tag data for both the second set of cache lines and a fourth set of cache lines.

18. The cache memory device of claim 17, further comprising:
a fifth set of cache lines associated with a fifth memory block, wherein the first way of the second plurality of ways comprises cache tag data for the fifth set of cache lines.

19. The cache memory device of claim 17, wherein the cache tag data in the first way of the first plurality of ways is for even numbered sets of cache lines in a cache memory, and wherein the cache tag data in the first way of the second plurality of ways is for even numbered sets of cache lines in the cache memory.

20. The cache memory device of claim 17, wherein the cache memory device comprises a set associative cache implemented on a dynamic random access memory (DRAM) device.

* * * * *